C. A. CHRIST.
CAN COVER.
APPLICATION FILED OCT. 1, 1918.

1,316,767.

Patented Sept. 23, 1919.

INVENTOR.
Charles A. Christ,
BY
ATTORNEYS.

UNITED STATES PATENT OFFICE.

CHARLES AUGUST CHRIST, OF TEMPE, ARIZONA.

CAN-COVER.

1,316,767.  Specification of Letters Patent.  Patented Sept. 23, 1919.

Application filed October 1, 1918. Serial No. 256,465.

*To all whom it may concern:*

Be it known that I, CHARLES AUGUST CHRIST, a citizen of the United States, residing at Tempe, in the county of Maricopa and State of Arizona, have invented new and useful Improvements in Can-Covers, of which the following is a specification.

My invention relates to a milk can cover.

It is an object of this invention to provide a milk can cover which at the same time acts as a strainer and having means for affording ventilation for the interior of the milk can, yet at the same time preventing dirt, and the like, from falling into the can.

With the above and other objects in view my invention consists in the construction, combination and arrangement of parts hereinafter described and claimed.

In the accompanying drawings, which form a part of this specification, I have shown an embodiment of my invention and in which, Figure 1 is a vertical central section of the upper part of the milk can showing my improved cover applied thereto.

Figure 2:
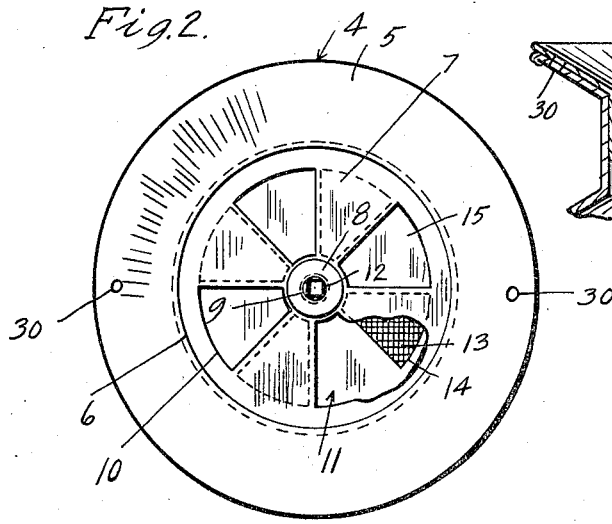
Fig. 2 is a top plan view of the cover with the handle removed therefrom.

Referring to the drawing, 1 indicates the upper end of a milk can of the usual type having a cylindrical neck 2 and provided with a downwardly flaring cover retaining flange 3. The milk can cover 4 has an upwardly and outwardly flaring flange 5 adapted to fit upon flange 3 of the milk can and a cylindrical neck 6 forming a snug fit in the neck 2 of the can. The bottom 7 of the cover 4 is provided with a central boss 8 provided with a threaded aperture 9. A plurality of circularly arranged fan-shaped apertures 10, are disposed between the boss 8 and the outer periphery of the bottom 7. A strainer and closure element 11 of a size slightly smaller than the bottom 7 of the can cover and provided with a square central aperture 12 has securely attached thereto on the under side, preferably by soldering, a fine meshed screen 13. The screen and closure member 11 has fan-shaped apertures 14 of a number and shape to correspond with the apertures 10 of the bottom 7 of the can cover, except that they are slightly smaller, so that when the same is turned the corresponding solid portions 15 of the member 11 will have their lateral edges extend for a slight distance laterally under the apertures 10, as clearly indicated in dotted lines in Fig. 2. The strainer and closure element 11 is mounted on the under side of the bottom 7 of the can cover by means of a rotary pin 16 provided at its upper end with a thumb nut 17. The pin 16 is screw threaded at the lower end 18, the extreme lower end 19 being reduced in size and squared. The pin 16 is threaded into the boss 8 of the bottom of the can cover 4, the squared end 19 fitting the square aperture 12 of the strainer element 11 which is secured thereto by means of a screw 20 engaging the threaded bore 21 in the squared end 19 of the pin 16. A helical spring 22 surrounding pin 16 is interposed between boss 8 and thumb nut 17 to provide frictional resistance against the turning of the pin 16.

Figure 1:
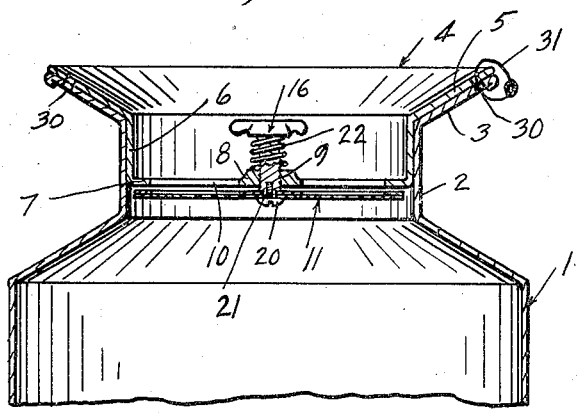
Figure 4:
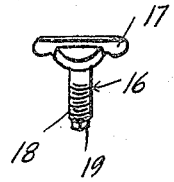
Fig. 4 is a perspective of the handle operating the strainer element.
Figure 5:
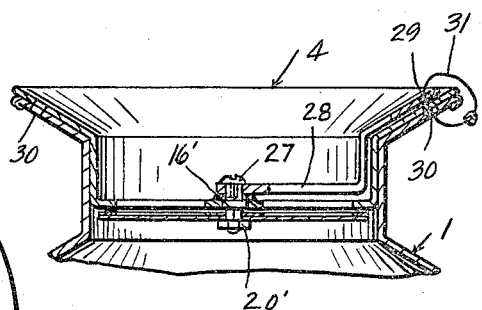
Fig. 5 is a vertical central section similar to Fig. 1 showing the modified form of my invention.
Figure 3:
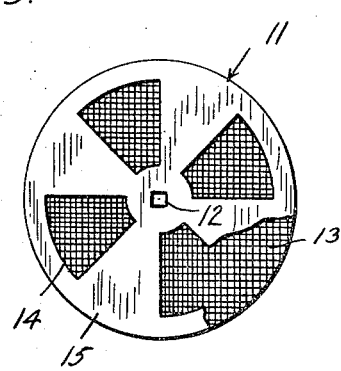
Fig. 3 is a top plan view of the strainer element with parts broken away to show the attachment of the screen.
Figure 6:
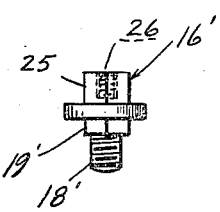
Fig. 6 is a perspective view of the rotary pin operating the strainer element in the modification shown in Fig. 5.

The modified form shown in Fig. 5 of the can cover 4 and the screen and closure element 11 are of the same construction as shown in Fig. 1, with the exception that the rotary pin, and the manual means operating the same, are of different construction and the helical spring 22 is dispensed with. A rotary pin 16' has the lower end threaded at 18' and the extreme end squared at 19' to fit a square aperture 12 of the member 11 which is attached thereto by nut 20' fitting a threaded end 18' on rotary pin 16'. The upper end of the pin 16' is squared at 25 and has a threaded socket 26 adapted for the reception of a screw 27 engaging said socket for retaining a crank 28 fitting over the squared end 25. The crank 28 extends in close proximity to the outer edge of the flange 5 of the can cover 4 and is provided with an aperture 29 adapted to register with apertures 30 provided at diametrically opposite points. A suitable seal 31 passes through the apertures 29 and 30 and prevents the turning of the crank 28.

It has been found that a large number of cans of milk sour during transportation and especially so in warm climates, or deteriorate in quality because of the rise of temperature therein which will cause the milk to have a bad odor. Empty milk cans when reshipped with the ordinary tight closure will develop a strong animal odor difficult to remove by washing. By the use of my improved milk can cover the milk is strained when poured into the can. By turning the rotary pin the solid portions of the closure element 11 are made to register under the apertures 10 of the bottom of the cover and can be tightly screwed in place if desired. The closure element 11 may be moved downwardly a slight distance from the bottom of the cover by turning the rotary pin 16 in the opposite direction, thereby providing a fine slit under the bottom 7, and the closure element 11 thereby affording ventilation to the interior of the can, yet without the danger of dirt dropping into it.

In the modification shown in Fig. 5, the crank 28 may be locked in position by means of the seal 31, thereby preventing any unauthorized tampering with the contents of the milk can.

Various changes in the construction and arrangement of parts may be made by those skilled in the art without departing from the spirit of my invention as claimed.

I claim:

1. The combination with a milk can having a straight neck and a flaring flange extending upwardly from the neck; of a milk can cover having an upwardly and outwardly flaring flange fitting the flange of the milk can and a cylindrical neck forming a tight fit in the neck of the milk can, and a bottom provided with a central boss having an aperture and a plurality of radial fan-shaped apertures arranged around the boss; a strainer and closure element slightly smaller than the bottom of the can cover and provided with a central aperture, and having radial openings adapted to register with the openings in the cover bottom, and adapted to turn out of registration with the openings in the cover bottom and be covered by the bottom; and a pin seated in the opening of the cover bottom and extending into the opening of the inclosure.

2. The combination with a milk can having a straight cylindrical neck and a flange extending upwardly and outwardly from the neck; of a milk can cover and strainer having an upwardly and outwardly flaring flange adapted to fit the flange of the milk can, and a cylindrical neck fitting tightly in the neck of the milk can and a bottom provided with a central boss and having fan-shaped apertures arranged radially around the boss; a strainer and closure element fitting upwardly against the bottom and having a square central aperture, and openings adapted to register with the openings in the bottom; a fine mesh screen secured to the lower face of the strainer and closure element; a pin screw seated through the central boss and fitting in the squared opening; a spring upon the pin above the boss; and means for holding the spring in place, the tension of the spring being exerted to hold the strainer and closure element in closed position.

In testimony whereof I have signed my name to this specification.

CHARLES AUGUST CHRIST.